United States Patent [19]

Eisenstadt

[11] 3,875,311

[45] Apr. 1, 1975

[54] CALORIE-FREE DIPEPTIDE SWEETENING COMPOSITION

[75] Inventor: Marvin E. Eisenstadt, Belle Harbor, N.Y.

[73] Assignee: Cumberland Packing Corporation, Brooklyn, N.Y.

[22] Filed: July 2, 1973

[21] Appl. No.: 375,696

Related U.S. Application Data

[63] Continuation-in-part of Ser. No. 375,697, July 2, 1973.

[52] U.S. Cl.................... 426/212, 426/217, 426/804
[51] Int. Cl................................................. A23l 1/26
[58] Field of Search......... 426/212, 213, 217, 57–73

[56] References Cited
UNITED STATES PATENTS

| | | | |
|---|---|---|---|
| 3,061,445 | 10/1962 | Stanish | 426/217 X |
| 3,492,131 | 1/1970 | Schlatter | 426/212 |
| 3,647,483 | 3/1972 | Eisenstadt | 426/217 |

*Primary Examiner*—Raymond N. Jones
*Assistant Examiner*—Esther L. Massung
*Attorney, Agent, or Firm*—Steinberg & Blake

[57] ABSTRACT

The artificial sweetener known as dipeptide sweetener, which is actually aspartyl phenylalanine methyl ester is mixed with specific proportions of glucono delta lactone and/or a gluconate salt as well as with specific proportions of cream of tartar and/or sodium bicarbonate and/or potassium bicarbonate in order to improve the sweetening properties of the composition and to give the same the more natural sweetness of ordinary sugar while still providing a calorie free product.

10 Claims, No Drawings

CALORIE-FREE DIPEPTIDE SWEETENING COMPOSITION

CROSS REFERENCE TO RELATED APPLICATIONS

This application is related to my copending application Ser. No. 320,210, filed Jan. 2, 1973, for "Artificial Sweetener," now abandoned, and a continuation-in-part thereof, Ser. No. 375,697, filed simultaneously herewith July 2, 1973 for "Dipeptide Sweetener Composition."

BACKGROUND OF THE INVENTION

The use of artificial sweeteners in the place of sugar for reduction of caloric intake as well as for medical reasons not only in connection with the treatment of obesity but also for diabetes, is well known. Until recently the only artificial sweeteners which have been used were the saccharines and the cyclamates.

The cyclamates have been banned from use by the Food and Drug Administration, and the use of saccharines has also become questionable in recent times.

A new artificial sweetener known as dipeptide sweetener, which is actually aspartyl phenylalanine methyl ester has recently been developed. Although this product has not as yet come into actual extensive use, it has already been determined that like the cyclamates and saccharine, the dipeptide sweetener although many times as sweet as sugar, actually about one hundred and fifty times as sweet as sugar, does not have the natural sweetness taste of ordinary sugar. The dipeptide sweetener exhibits a flat sweetness along with a slight bitter aftertaste. In addition, when used for the sweetening of beverages, for example, the sweetness is slightly delayed. In other words, someone drinking a cup of coffee sweetened solely with dipeptide sweetener would at first not taste the sweetness. Shortly thereafter the sweet taste would appear, but this sweet taste would not be a natural sweet taste because of what may best be referred to as a flatness of taste, and in addition, a bitter aftertaste occurs in the mouth of the user.

In my copending applications mentioned above, I described products which avoid these undesired taste effects of the dipeptide sweetener by combining the same with lactose and/or dextrose as well as with cream of tartar and/or a bicarbonate. While these compositions avoid the undesired taste effects of the dipeptide sweetener, they also provide calories. Although the caloric content is not great, it must be taken into consideration by diabetics, and therefore the use of the lactose and/or dextrose limits the use of the product for some diabetics.

SUMMARY OF THE INVENTION

Generally speaking, in accordance with the present invention, a composition is provided of dipeptide sweetener plus glucono delta lactone and/or a gluconate salt, e.g. sodium gluconate or potassium gluconate, plus cream of tartar and/or a bicarbonate (sodium bicarbonate or potassium bicarbonate) in specific proportions. This composition is many times as sweet as natural sugar, and can nevertheless be used for sweetening purposes with the same natural sweetness as in the case of ordinary sugar, and in addition does not provide any carbohydrate so that it can be used freely by diabetics and does not provide any calories so that it is even more effective in weight reduction programs.

It is accordingly a primary object of the present invention to provide a sweetening composition utilizing dipeptide sweeteners as the artificial sweetening agent, which composition does not have the flat sweetness taste or cloying sweetness of the dipeptide sweetener and also does not have the bitter aftertaste of the dipeptide sweetener, and in addition does not provide any calories.

It is yet a further object of the present invention to provide composition of dipeptide sweetener plus glucono delta lactone and/or a gluconate plus cream of tartar and/or a bicarbonate, which composition has a natural sweet taste without undesired aftertaste or cloying sweetness, which can be used on all types of foods for providing a sweetening effect which is akin to that of natural sugar, and which does not provide any carbohydrates or calories.

Other objects and advantages of the present invention will be apparent from the further reading of the specification and of the appended claims.

The term "dipeptide sweetener" as used herein refers to aspartyl phenylalanine methyl ester. The term "saccharine artificial sweetener" as used herein is meant to refer to saccharine itself and the salts thereof such as sodium saccharine, potassium saccharine, etc. Cream of tartar is of course also known as potassium bitartrate, and these terms will be used interchangeably.

In accordance with the present invention, the following composition is prepared: (a) the dipeptide sweetener is mixed with (b) cream of tartar and/or sodium bicarbonate and/or potassium bicarbonate, and also with (c) glucono delta lactone and/or sodium gluconate and/or potassium gluconate in a ratio of one part of (a) to 1/25–6 parts of (b), most preferably ¼–2 parts of (b) and with 5–50 parts of (c), most preferably 10–20 parts of (c). All parts herein are parts by weight.

When these compounds are used in these proportions, the most desired effect of sweetness approaching that of natural sugar without any flatness of taste and without any cloying sweetness or any bitter aftertaste is obtained.

It should also be noted that in accordance with the present invention it is possible to substitute up to 50 percent by weight of the dipeptide sweetener with a saccharine artificial sweetener.

In connection with this invention it is noted that too great an amount of (c) can result in a composition which has a tendency towards sourness and even more important will actually cause milk to curdle so that the composition cannot be used for the sweetening of coffee, for example. It is therefore essential that the amount of (c) be within the limits set forth herein. Furthermore, if (c) were used alone in compositions of the invention, then even the maintaining of (c) within the limits set forth herein would not be sufficient to obtain a complete masking of the undesired unnatural sweetness of the dipeptide sweetener without the disadvantages of possible sourness and curdling of milk. For this reason, it is necessary to use (b) along with (c) in the composition of the invention. However, if (b) were used alone, that is without (c) there would be no masking of the undesired taste characteristics of the dipeptide sweetener. The masking of the undesired taste characteristics cannot be accomplished by (b) alone, but (b) in combination with (c) effects a masking of all undesired taste characteristics while preventing the undesired effects of the use of (b) alone.

In connection with (b) it is noted that this consists of either cream of tartar alone or sodium bicarbonate alone or potassium bicarbonate alone or any mixture thereof. It is preferred in accordance with the present invention to use either sodium bicarbonate or potassium bicarbonate. Although cream of tartar can be used alone, cream of tartar does have a slight souring effect, and it is therefore preferred when using cream of tartar to use it in admixture with sodium bicarbonate or potassium bicarbonate.

In connection with (c) this can consist of either glucono delta lactone alone or sodium gluconate alone or potassium gluconate alone, or any mixture thereof. It is preferred in accordance with the present invention to use either glucono delta lactone alone or in admixture with sodium gluconate. On the other hand, either sodium gluconate alone can be used or potassium gluconate can be used. Potassium gluconate while being highly effective for the purposes of the invention is far more expensive than sodium gluconate, and consequently sodium gluconate is always preferred over potassium gluconate, although only from the standpoint of economy.

Thus, in accordance with the present invention it is necessary to use (b) and (c) in the proportions indicated along with the dipeptide sweetener in order to obtain a masking of the slight sweetness and bitter aftertaste of the dipeptide sweetener and in order to achieve the development of the rapid natural sweetness. As indicated above, up to 50 percent of the dipeptide sweetener can be substituted by saccharine without any adverse effects.

In percentages by weight, the composition of the present invention consists essentially of about 2-12 percent of (a), preferably 5-7 percent, about 0.5-12 percent of (b), preferably about 2-8 percent, and about 65-97 percent of (c), preferably about 82-92 percent.

DESCRIPTION OF PREFERRED EMBODIMENTS

The following examples are given to further illustrate the present invention. The scope of the invention is not, however, meant to be limited to the specific details of the examples.

EXAMPLE 1

53.9 lbs. of glucono delta lactone, 36.3 lbs. of sodium gluconate, 5.5 lbs. of dipeptide sweetener, 1.07 lbs. of cream of tartar and 3.23 lbs. of sodium bicarbonate are thoroughly mixed to provide a uniform mixture.

The resulting mixture is approximately ten times as sweet as sugar and can be used in the place of sugar to give a sweetening effect with no carbohydrate or caloric intake whatsoever. This composition can be used to sweeten beverages or in cooking, and all quantities, even to highly sweetened beverages, without causing any bitter aftertaste and without adversely affecting the taste of the food or beverage to which it is applied. Furthermore, the composition does not curdle milk.

EXAMPLE 2

A sweetening composition is prepared as in Example 1, however using 4.30 lbs. of sodium bicarbonate and no cream of tartar.

EXAMPLE 3

A sweetening composition is prepared as in Example 1, however using potassium bicarbonate in place of the sodium bicarbonate.

EXAMPLE 4

6.2 lbs. of dipeptide sweetener, 85.8 lbs. of glucono delta lactone and 8.0 lbs. of potassium bicarbonate are thoroughly mixed to provide a uniform mixture.

The resulting mixture can be used in the same manner as the composition of Example 1.

EXAMPLE 5

A sweetening composition is prepared as in Example 4, however substituting 6 lbs. of sodium bicarbonate and 2 lbs. of cream of tartar for the potassium bicarbonate.

EXAMPLE 6

A sweetening composition is prepared as in Example 4, however using 4.2 lbs. of dipeptide sweetener and 2.0 lbs. of sodium saccharine.

While the invention has been described in particular with respect to the use of specific amounts of specific ingredients, it is to be understood that variations and modifications of the invention can be made without departing from the spirit or scope thereof.

What is claimed is:

1. A sweetening composition consisting essentially of (a) dipeptide sweetener, (b) at least one agent selected from the group consisting of potassium bitartrate, sodium bicarbonate and potassium bicarbonate, and (c) at least one compound selected from the group consisting of glucono delta lactone, sodium gluconate and potassium gluconate, in proportions by weight of about 1/25-6 parts (b) per each part of (a) and about 5-50 parts of (c) per each part of (a).

2. Composition according to claim 1 wherein said compound is glucono delta lactone.

3. Composition according to claim 1 wherein said compound is sodium gluconate.

4. Composition according to claim 1 wherein said compound is a mixture of glucono delta lactone and sodium gluconate.

5. Composition according to claim 1 wherein said agent is sodium bicarbonate.

6. Composition according to claim 1 wherein said agent is potassium bicarbonate.

7. Composition according to claim 1 wherein said agent is a mixture of potassium bitartrate and sodium bicarbonate.

8. Composition according to claim 1 wherein said agent is a mixture of potassium bitartrate and potassium bicarbonate.

9. Composition according to claim 1 wherein the proportions of the components are ¼-2 parts of (b) per each part of (a) and 10-20 parts of (c) per each part of (a).

10. Composition according to claim 1 wherein up to 50 percent of said dipeptide sweetener is substituted by a saccharine artificial sweetener.

* * * * *